Patented June 4, 1929.

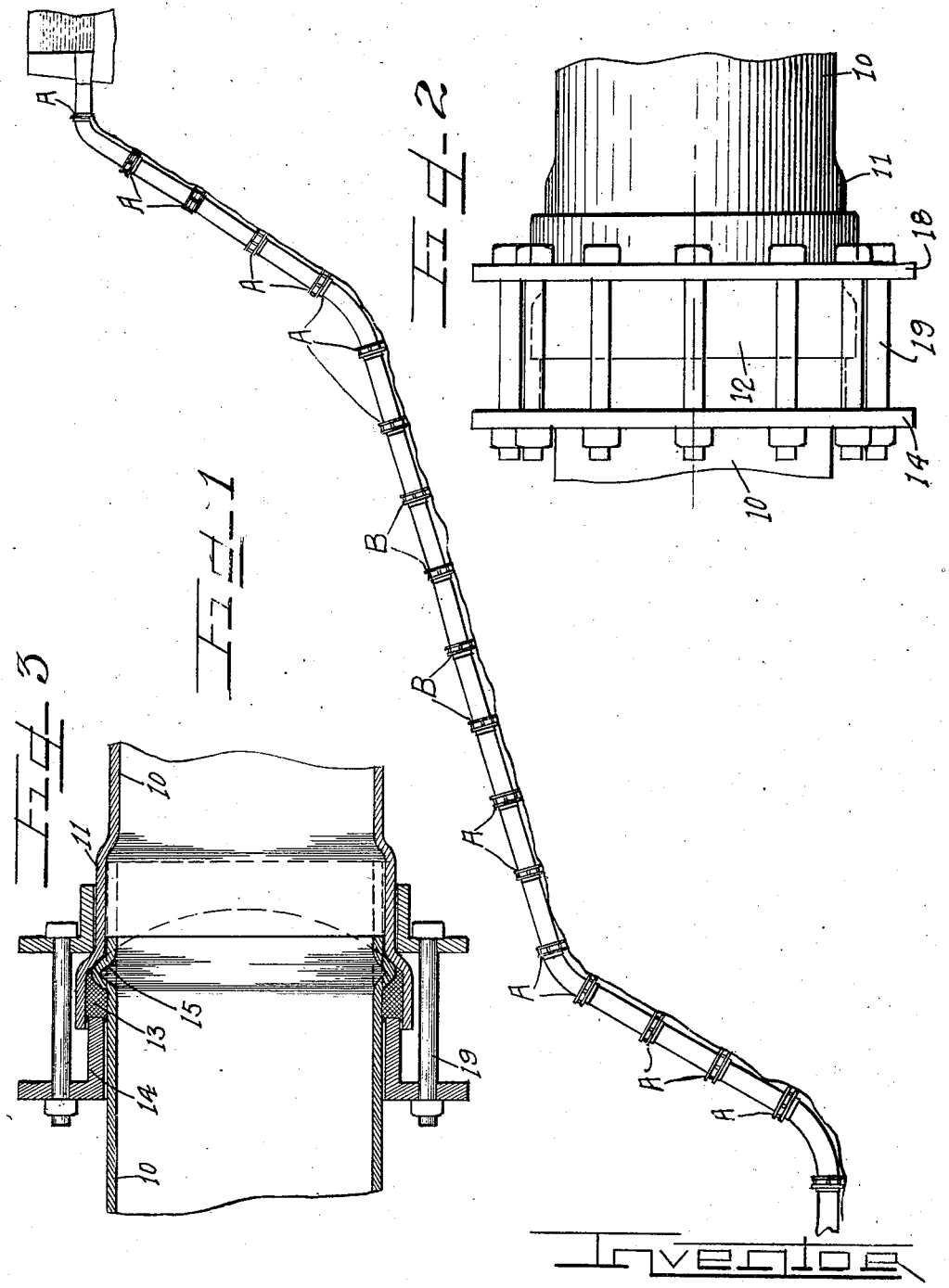

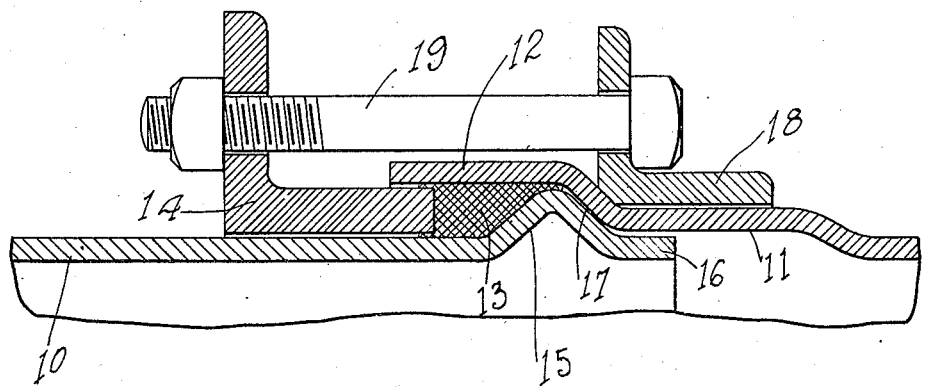
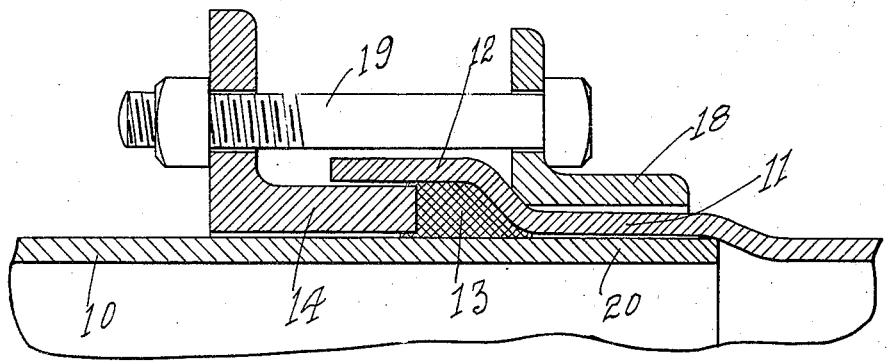

1,715,436

UNITED STATES PATENT OFFICE.

JAMES HALL TAYLOR, OF CHICAGO, ILLINOIS.

PIPE LINE.

Application filed March 8, 1924. Serial No. 697,729.

This invention relates to an improved pipe line construction for such purposes as hydraulic penstocks and oil lines which must be laid over undulating country.

It is an object of this invention to provide a construction of pipe lines which will be capable of conforming to the general lay of the land without the extra expense of special fittings to meet anything but very special conditions such as abrupt bends and the like.

It is another object of this invention to obviate elaborate means for anchorage and for localizing and taking care of expansion and contraction in the pipe line due to seasonal and daily temperature variations, without requiring special fittings.

It is a further object of this invention to provide a combination type of joint for pipe lines wherein one type of male end may be used as a slip joint in straight runs of the line and another type of male end may be used as an anchorage joint adjacent curves or bends of the line whereby the portion of the pipe line adjacent lateral or vertical bends is firmly secured together as a unit and serves to anchor the line at such bends eliminating expensive concrete footings and anchors that localize the expansion and contraction stresses in the pipe line.

Other and further important objects of this invention will be apparent from the disclosures in the specification and accompanying drawings.

This invention (in a preferred form) is illustrated in the drawings and hereinafter more fully described.

On the drawings:

Figure 1 is a plan view of a typical pipe line or penstock construction as laid out to follow the contours of the ground.

Figure 2 is a side view of both types of joint.

Figure 3 is an enlarged section of a type of joint having a small angular adjustment.

Figure 4 is an end fragmentary section of the joint shown in Figure 3.

Figure 5 is an end fragmentary section of an expansion joint.

As shown on the drawings:

This invention contemplates the assembly of a pipe line from standard lengths of pipe having two different types of joint, that illustrated in Figure 4 providing for a slight angular displacement between two pipe sections with the effect of anchoring the sections, which will be hereinafter referred to as type A; while that illustrated in Figure 5 provides for linear expansion and contraction and will be referred to as type B. Each pipe section 10 is provided with a double step bell or socket end which is the same whether the other end of the pipe section is of the form of type A or type B. This double bell comprises an inner enlargement 11 to receive the end of a similar pipe section of the same diameter and a larger outer bell 12 to receive suitable packing 13 and a follower ring 14.

The type A joint of Figures 3 and 4 comprises a bead or V 15 rolled or otherwise formed circumferentially near the end of the pipe 10, a short straight section 16 being left at the extreme end to limit the angular displacement of the joint by contact with the somewhat larger diameter of the inner bell 11. The contacting surface 17 of the bead 15 may be formed as a segment of a sphere so that angular displacement within the limit imposed by the straight end 16 will not prevent a continuous metal to metal contact between the bottom of the large bell 12 and the bead surface 17. A clamping ring 18 is loosely engaged behind the shoulder formed by the second bell 12 and a series of bolts 19 between this clamping ring 18 and the follower ring 14 serves to compress the packing 13 and thereby seal the joint.

The type B joint of Figure 7 is intended to permit expansion and contraction and differs from the type A joint only in omitting the bead 15 to allow longitudinal movement of the end 20 of one pipe section relative to the bells of the adjoining section. It will be apparent that the type B joint can be made in the field by cutting off the bead 15 of the type A joint.

The penstock shown in Figure 1 is built up with A type joints at the bends together with one or more joints at either side of the bend, thereby providing a solid length of pipe to serve as an anchor for the balance of the pipe line, thus eliminating expensive concrete footings or anchors and greatly simplifying the laying of the line. The balance of the pipe line between the bends is made up of B type expansion joints which allow individual expansion and contraction of each section so that expansion is not localized at any one point as has heretofore been necessary with expensive anchorages.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

In a pipe joint, in combination, a section of pipe having a V-shaped integral enlargement and a rearwardly continuing portion of uniform diameter to the end of the section, another section of pipe having its greatest diameter at its forward end and having its diameter decreased in steps as it extends rearwardly, presenting relatively short portions of uniform diameter connected by downwardly and rearwardly curved shoulders, the forward portion of greatest bore adapted to envelop the first-named section at its enlargement and for a short distance forward of the enlargement, the forward shoulder of the second-named section turnably abutting the downwardly and rearwardly extending surfaces of the enlargement of the first-named section, and the next succeeding portion of uniform and decreased diameter of the second-named section being adapted to envelope the aforesaid rearwardly continuing portion of the first-named section and permit limited lateral movement of the sections, and clamping means cooperating with packing means engaging the enlarged portion of the first named section to hold the aforesaid pipe sections together and to prevent longitudinal movement of the sections.

In testimony whereof I have hereunto subscribed my name.

JAMES HALL TAYLOR.